United States Patent [19]
Cullen et al.

[11] Patent Number: 6,116,083
[45] Date of Patent: Sep. 12, 2000

[54] EXHAUST GAS TEMPERATURE ESTIMATION

[75] Inventors: Michael John Cullen, Northville; Robert Roy Jentz, Westland; James Matthew Kindree, Livonia; David Robert Nader, Farmington Hills, all of Mich.

[73] Assignee: Ford Global Technologies, Inc., Dearborn, Mich.

[21] Appl. No.: 09/232,883

[22] Filed: Jan. 15, 1999

[51] Int. Cl.[7] .................................................. G01M 15/00
[52] U.S. Cl. ........................................................... 73/118.1
[58] Field of Search ............................. 73/23.31, 23.32, 73/116, 117.2, 117.3, 118.1

[56] References Cited

U.S. PATENT DOCUMENTS

| | | | |
|---|---|---|---|
| 3,969,614 | 7/1976 | Moyer et al. | 235/150.21 |
| 4,142,495 | 3/1979 | Lahiff | 123/119 |
| 4,433,666 | 2/1984 | Masaki et al. | 123/569 |
| 5,209,212 | 5/1993 | Viess et al. | 123/571 |
| 5,414,994 | 5/1995 | Cullen et al. | |
| 5,515,833 | 5/1996 | Cullen et al. | |
| 5,525,833 | 6/1996 | Jang | |
| 5,537,977 | 7/1996 | Hartman et al. | 123/422 |
| 5,544,639 | 8/1996 | Shouda et al. | |
| 5,546,915 | 8/1996 | Isobe | 123/570 |
| 5,586,544 | 12/1996 | Kitamura et al. | |
| 5,621,167 | 4/1997 | Fang-Cheng | 73/118.1 |
| 5,732,688 | 3/1998 | Charlton et al. | |

FOREIGN PATENT DOCUMENTS 52-64533  5/1977  Japan .

*Primary Examiner*—Eric S. McCall

[57] ABSTRACT

EGR system for an internal combustion engine (105) comprises an EGR valve (150) disposed in an EGR recirculation conduit (125) involves estimating exhaust gas temperature at an engine exhaust manifold. An exhaust gas temperature drop between the exhaust manifold and the EGR valve is estimated and a time constant is determined that models the exhaust gas temperature as a function of EGR mass flow rate so that exhaust gas temperature at the EGR valve can be estimated by adjusting the estimated exhaust gas temperature at the exhaust manifold by the exhaust gas temperature drop and the time constant.

10 Claims, 2 Drawing Sheets

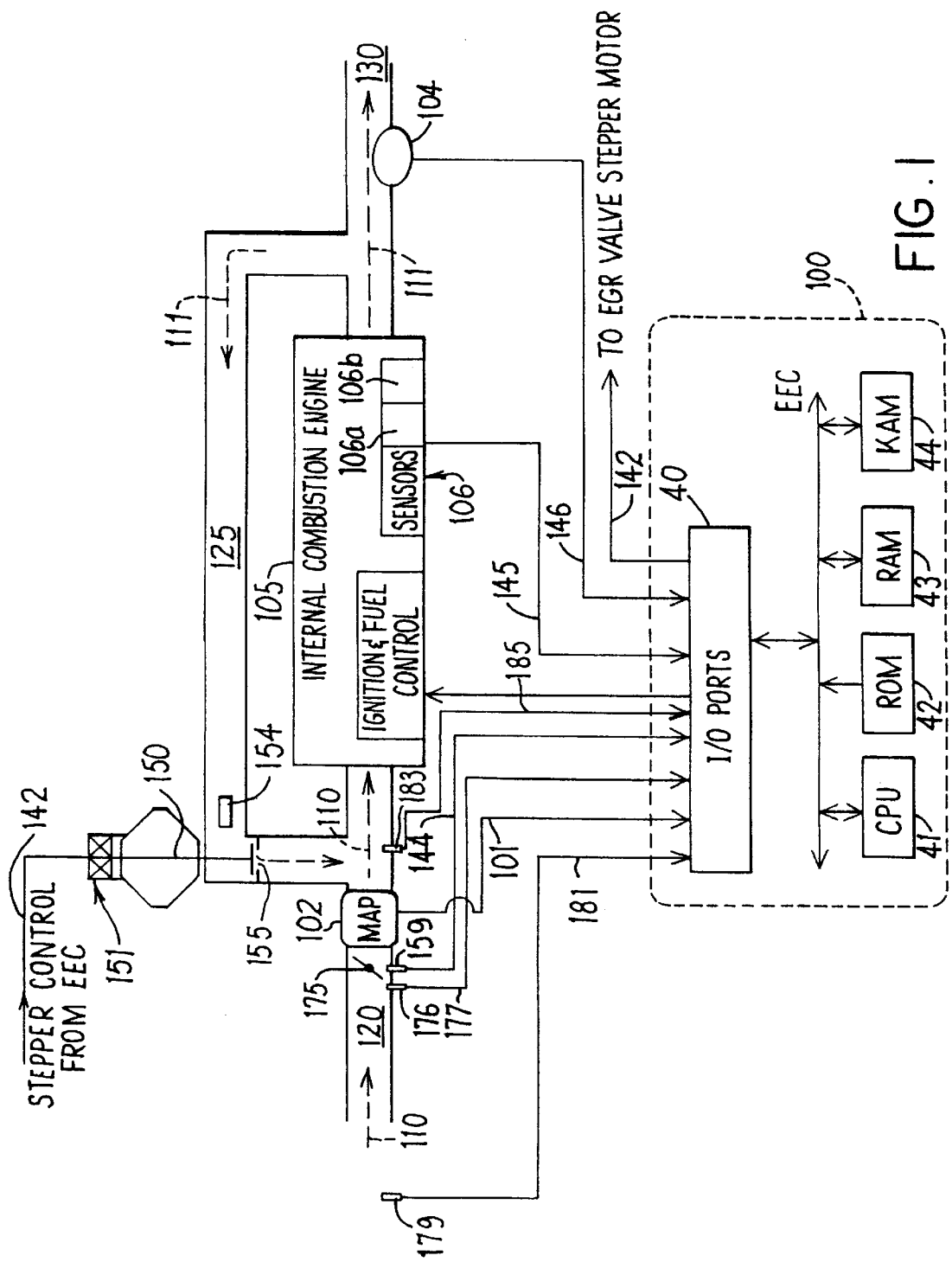

EXHAUST GAS TEMPERATURE ESTIMATION

BACKGROUND OF THE INVENTION

1. Field of the Invention

The present invention relates to an exhaust gas recirculation system of an internal combustion engine.

2. Description of Related Art

Internal combustion engines typically include an exhaust gas recirculation (EGR) system to recirculate a controlled portion of the engine exhaust gas into an engine intake manifold in order to provide a reduction in $NO_x$ emissions. Typically, a control mechanism including an EGR valve is provided to vary the EGR rate according to one or more sensed conditions, such as engine coolant temperature, air charge entering the intake manifold, and engine speed. A stepper motor driven EGR valve has been employed in an exhaust gas recirculation system wherein stepper motor steps are calculated primarily as a function of engine speed and air charge. Control of the EGR stepper motor without accounting for the temperature of the exhaust gas flowing through the EGR system can produce errors in control of the EGR valve and resulting EGR mass flow rate.

An object of the present invention is to provide an estimated EGR exhaust gas temperature to improve control of an EGR valve to provide a desired EGR mass flow rate.

SUMMARY OF THE INVENTION

An embodiment of the present invention estimates EGR gas temperature at an EGR valve of an EGR system of an internal combustion engine by estimating exhaust gas temperature at a location in the engine exhaust manifold, estimating the exhaust gas temperature drop between the exhaust manifold location and the EGR valve orifice, and estimating a time constant that models dynamics of the exhaust gas temperature at the EGR valve versus EGR mass flow rate. The exhaust gas temperature at the EGR valve is estimated by adjusting the estimated exhaust gas temperature at the exhaust manifold location by the estimated exhaust gas temperature drop and the estimated time constant.

BRIEF DESCRIPTION OF DRAWINGS

FIG. 1 is block diagram of a portion of an internal combustion engine and electronic engine controller which embodies principles of the invention.

DETAILED DESCRIPTION OF THE PREFERRED EMBODIMENT

Figure 3:
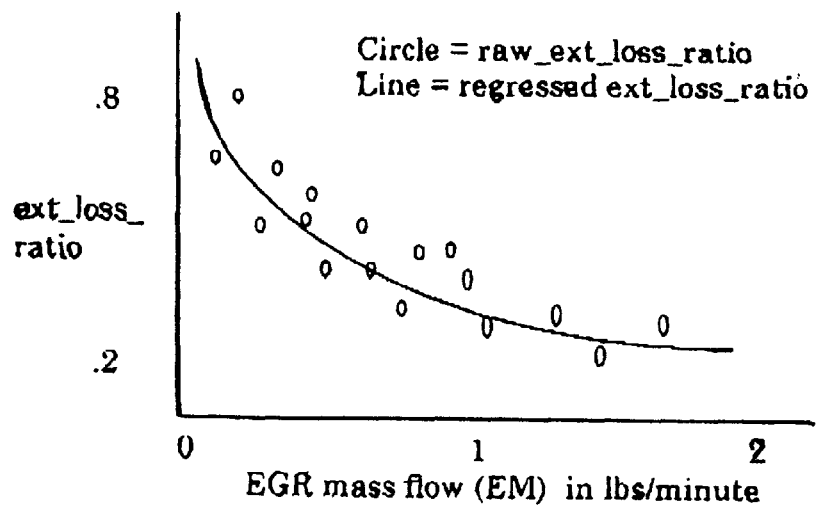
FIG. 3 is a graph of the EGR gas temperature loss ratio versus EGR mass flow rate.

FIG. 1 illustrates an internal combustion engine 105 whose operation is controlled by Electronic Engine Controller (EEC) 100, which includes a central processing unit 41 (CPU), a read-only memory (ROM) 42 for storing control programs, a random-access memory (RAM) 43 for temporary data storage, a keep-alive memory (KAM) 44 for storing learned values, conventional data bus and I/O ports 40 for transmitting and receiving signals to and from the engine. EEC 100 receives signals from a plurality of sensors generally designated 106, including but not limited to, an engine speed sensor and engine circulating coolant temperature sensor designated schematically at 106a and 106b, which transmit signals containing information indicative of the rotational speed of the engine, the temperature of the engine coolant circulating in the engine, and other engine operating parameters to EEC 100 over respective signal lines designated generally as 145. Each of the sensors 106 is conventional and may take one of several known forms. EEC 100 receives signals 145 along with other signals such as signals 144 and 146 described below and generates control signals for controlling spark timing, the rate of fuel delivered to engine combustion chambers and other operational functions of the engine. For example, engine 105 draws an intake air mixture into intake manifold 120 past a manifold absolute pressure (MAP) sensor 102 which transmits a signal 101 indicative of MAP to EEC 100. A throttle position sensor 159 senses the angular position of throttle lever 175 and transmits a throttle position signal 144 indicative of the angular position of throttle lever 175 to EEC 100. Dotted line 110 indicates the flow of the intake charge air entering the intake manifold 120. An air temperature sensor 176 can be used to detect the temperature of the air charge on the fresh air side of the throttle plate entering intake manifold 120 and transmits a representative signal 177 to EEC 100. Ambient air temperature sensor 179 is disposed outside the engine air cleaner assembly (not shown) and senses ambient temperature and transmits a representative signal 181 to EEC 100. Manifold charge temperature sensor 183 is disposed in manifold 120 and senses manifold charge temperature, which can include air and EGR gas, between the engine throttle plate and engine intake valves and transmits representative signal 185 to EEC 100. Sensors 102, 159, 176, 179 and 183 are each conventional.

Exhaust gas generated from the combustion of an air/fuel mixture within the engine combustion chambers (not shown) travels from the combustion chambers through exhaust manifold 130 as indicated by dotted lines 111. A heated exhaust gas oxygen sensor (HEGO) 104 detects the oxygen content within the exhaust gas and transmits a representative signal 146 to EEC 100.

The engine includes an exhaust gas recirculation (EGR) system for transporting a controlled portion of exhaust gas generated by the engine from an exhaust manifold 130 into the intake manifold 120 via an EGR conduit or passage 125. The amount of exhaust gas which is recirculated from the exhaust manifold to the intake manifold is controlled by a conventional DC stepper motor driven EGR valve 150 having a stepper motor 151 that receives signals 142 from EEC 100 to axially move the valve 150 in incremental steps in a manner to control its position relative to a flow orifice 155 communicating to intake manifold 120.

Control of the EGR system is effected as a portion of a background routine executed by the EEC 100 substantially continuously during engine operation in the absence of higher priority interrupt routines. Enablement of the stepper motor driven EGR valve 150 occurs only under engine operation conditions where all of the associated hardware is operating properly. For example, the EGR valve is enabled when the engine is not in a closed throttle mode, not commanded off by torque control strategy and not in a crank mode, and the sensors 102, 106a, 106b, 159, 176, 179, 183 are operating in acceptable manner and generate respective signals.

In enabling the EGR system, if the engine coolant temperature at engine start is less than a calibratable minimum value (e.g. less than 180 degrees F.), then the EGR system is ramped on over a calibratable time period, EGRMPT. (e.g.

30 seconds) via a multiplier TESGRE. If the engine coolant temperature at engine start is greater than the calibratable minimum value, then the EGR system is immediately enabled. Implementation of the EGR routine by EEC 100 in this manner is described and shown in FIG. 2 of U.S. Pat. No. 5,515,833 of common assignee herewith, the teachings of which are incorporated herein to this end.

Figure 2:
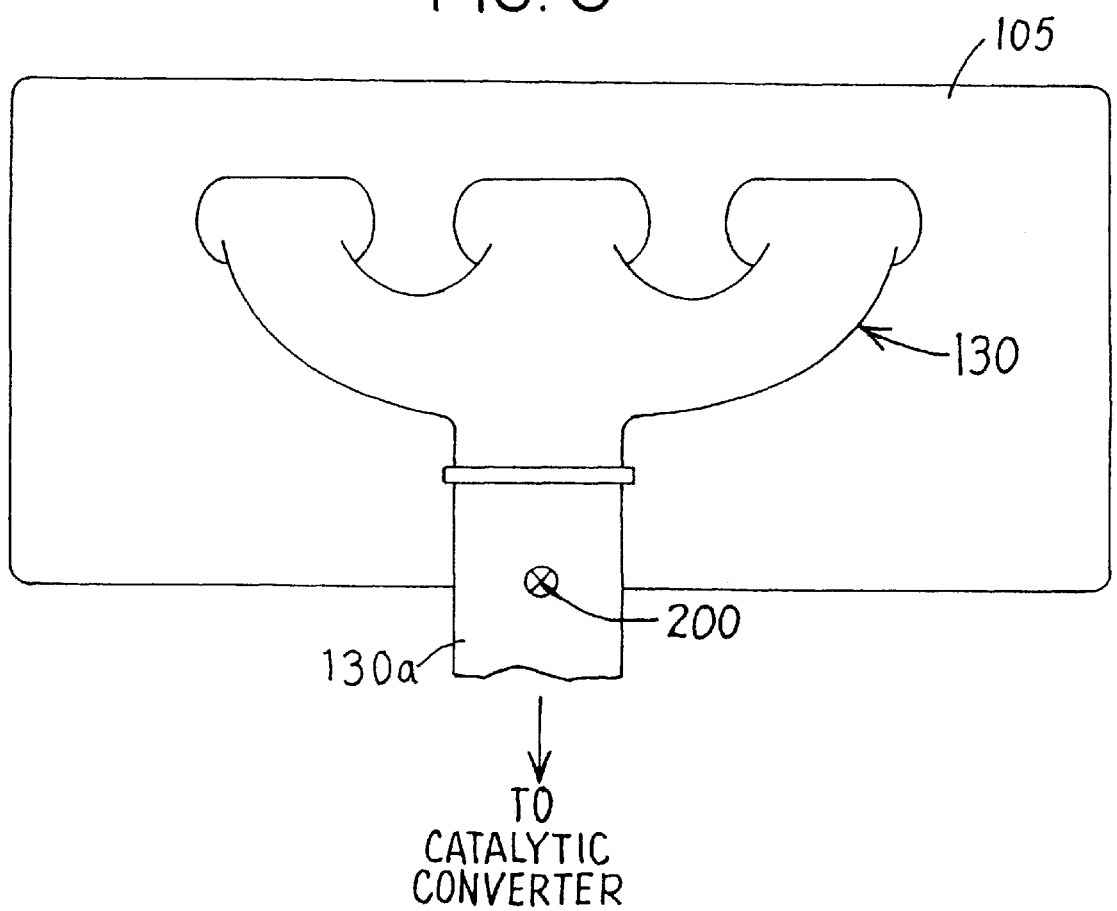
FIG. 2 is a schematic elevational view of an internal combustion engine having an exhaust manifold for practicing an embodiment of the invention.

In accordance with an embodiment of the present invention, the exhaust gas temperature at EGR valve 150 (e.g. at the hot upstream side of EGR valve orifice 155) is estimated by estimating an exhaust gas temperature at engine exhaust manifold 130 in accordance with U.S. Pat. No. 5,414,994, the teachings of which are incorporated herein by reference. For example, exhaust gas temperature is estimated as described below at a flange 130a of the engine exhaust manifold 130 where a temperature sensor 200, FIG. 2, is shown positioned for engine dynamometer testing only; i.e. sensor 200 is not used in actual practice of the invention where EGR gas temperature at the EGR valve 150 is estimated as described below. The estimated exhaust gas temperature at the flange 130a is adjusted by estimated drop, ext_ls_egr, of the exhaust gas temperature between the exhaust manifold flange 130a and the EGR valve orifice 155 and by an EGR exhaust gas temperature time constant designated tc_tmp that models dynamics of the exhaust gas temperature versus EGR mass flow rate.

Practice of an embodiment of the invention is illustrated by the following logic sequence, which includes initialization logic when the engine is off (not running).

Intialization Logic

By the initialization logic, it is determined whether this is the first pass through the computer logic by first pass flag (ext_init), If ext_init=0, then an instantaneous inferred EGR gas temperature, ext_egr, on the hot side of the EGR valve orifice 155 is estimated by:

$$\text{ext\_egr} = (\text{ext\_egr} - \text{aatemp}) * \text{FNEXP} \ (-\text{soak\_cat}/\text{TC\_SOAK\_EGR}) + \text{aatemp} \qquad (1)$$

where FNEXP is a function which takes an exponential of its argument, soak_cat is time since engine was turned off (soak time), and TC_SOAK_EGR is a calibratable time constant governing cooling off of the EGR gas near the EGR valve orifice 155 during a soak, and aatemp is ambient air temperature (Deg. F.) measured by sensor 179.

Engine Running Erg-On Logic

If it is determined that this is not the first pass through the computer logic by first pass flag (ext_init=1) and the engine is running with EGR flow (em greater than 0), then the logic calculates instantaneous inferred EGR gas temperature, ext_egr, on the hot side of the EGR valve orifice 155 by determining the temperature loss or drop, ext_ls_egr, from the exhaust flange 130a to the EGR valve orifice 155 by:

$$\text{ext\_loss\_ratio} = (\text{EXTEGRLS\_INT} + \text{EXTEGRLS\_LIN}*\text{em} + \text{EXTEGRLS\_SQR}*\text{em}^2)^2 \qquad (2)$$

$$\text{ext\_ls\_egr} = ((\text{ext\_egr} + \text{ext\_fl})/2 - \text{aatemp}) * \text{ext\_loss\_ratio} \qquad (3)$$

where em is the EGR mass flow rate (lbs/minute) and EXTEGRLS_INT, EXTEGRLS_LIN, EXTEGRLS_SQR are coefficients of a second order linear least squares regression of the temperature loss from ext_fl (EGR gas temperature at the flange 130a) to ext_egr (EGR gas temperature at EGR orifice 155) expressed as, ext_loss_ratio, the ratio of actual temperature loss divided by the potential temperature loss. The estimated variable ext_ls_egr is the temperature loss or drop of the EGR gas from the exhaust flange 130a to the EGR valve orifice 155. EGR mass flow rate, em, can be determined as described in U.S. Pat. No. 5,515,833 and in copending application entitled "Exhaust Gas Recirculation System" (Attorney Docket No. 198-0297 Ser. No. 09/232,900 filed Jan. 15, 1999) filed of even date herewith and of common assignee, the teachings of both of which are incorporated herein by reference.

The steady state estimate of the temperature loss or drop of the EGR gas from the exhaust flange 130a to the EGR valve orifice 155 is determined by:.

$$\text{ext\_ss\_egr} = \text{ext\_fl} - \text{ext\_ls\_egr} \qquad (4)$$

An EGR temperature time constant, tc_tmp, is determined empirically to be a function of EGR mass flow and is represented by equation 5. This time constant accounts, among various factors, for the effect of higher EGR mass flow rates in decreasing the time required for the EGR gas temperature to reach a new equilibrium value.

$$\text{tc\_tmp} = (\text{EXTEGRTC\_INT} + \text{EXTEGRTC\_LIN}*\text{em} + \text{EXTEGRTC\_SQR}*\text{em}^2)^2 \qquad (5)$$

by a second order regression of the time constant, tc-tmp, of EGR gas temperature versus EGR mass flow rate (lbs/minute), em, where EXTEGRTC_INT, EXTEGRTC_LIN, EXTEGRTC_SQR are coefficients of a second order linear least squares regression of the temperature loss from ext_fl (EGR gas temperature at the flange 130a) to ext_egr (EGR gas temperature at EGR orifice 155) expressed as a ratio of actual temperature loss divided by the potential temperature loss. The time constant, tc_tmp is used in a manner described below to estimate instantaneous EGR gas temperature.

The variable, ext_loss_ratio referred to above can be derived in the following manner. For example, from equation (3), an equation for ext_loss_ratio can be derived where the numerator is the actual EGR gas temperature loss and the denominator is the potential EGR gas temperature loss from the exhaust flange 130a to the EGR valve orifice 155:

$$\text{ext\_loss\_ratio} = \text{ext\_ls\_egr}/((\text{ext\_egr} + \text{ext\_fl})/2 - \text{aatemp}) \qquad (6)$$

Under steady state conditions, $$\text{ext\_loss\_egr} = (\text{ext\_fl} - \text{ext\_egr}) \qquad (7)$$

such that substituting equation 6 into equation 5, yields $$\text{ext\_loss\_ratio} = (\text{ext\_fl} - \text{ext\_egr})/((\text{ext\_egr} + \text{ext\_fl})/2 - \text{aatemp}) \quad (8)$$

Substituting in raw thermocouple values labeled raw_ext_fl at thermocouple 200 and raw_ext_egr at sensor 154, the raw temperature loss or drop, raw_ext_loss_ratio, of the EGR gas from the exhaust flange 130a to the EGR valve orifice 155 is determined by:

$$\text{raw\_ext\_loss\_ratio} = (\text{raw\_ext\_fl} - \text{raw\_ext\_egr})/((\text{raw\_ext\_egr} + \text{raw\_ext\_fl})/2 - \text{raw\_aatemp}) \qquad (9)$$

Actual engine data is taken on an engine dynamometer at steady state conditions over engine speed, load, and EGR mass flow percent which is measured in conventional manner using conventional intake and exhaust carbon dioxide chemical analyzers. Equation 8 is used to calculate raw_ext_loss_ratio. The raw data produced by equation 8 can be plotted as shown in FIG. 3 and a regression line can be created through the data plot by conventional regression software, the resulting regression coefficients being the desired calibration variables in equation 2. Better fits with the data are achieved by regressing the square root of the raw_ext_loss ratio, and then squaring the result in the on-board computer (EEC 100).

Engine Running Erg-Off Logic

If it is determined that this is not the first pass through the computer logic by first pass flag (ext_init=1) and the engine is running with EGR closed or off (stagnant) such that em=0, then there is no EGR gas temperature drop or loss function and the time constant is scalar, and the logic estimates steady state EGR gas temperature on the hot side of the EGR valve orifice 155 by:

$$\text{ext\_ss\_egr} = \text{EXTEGRWGT} \cdot \text{ect} + (1 - \text{EXTEGRWGT}) \cdot \text{act} \tag{10}$$

where EXTEGRWGT is a calibratable weighting factor of engine coolant temperature, ect, and air charge temperature, act, in the intake manifold 120 on the fresh air side of the engine throttle plate to describe the temperature of the exhaust gas near the EGR valve 150 when the engine is running but the EGR valve is closed.

The instantaneous value, ext_egr, of EGR gas temperature is estimated by applying a first order time constant using the scalar time constant:

$$\text{tc\_tmp} = \text{EXTGROE\_TC} \tag{11}$$

where EXTGROE_TC is determined empirically under engine running and zero EGR mass flow rate conditions for the exhaust gas temperature near the EGR valve 150. This time constant accounts, among various factors, for the time it takes the EGR conduit, and therefore EGR orifice, temperature to reach a new equilibrium value.

ALL ENGINE RUNNING EGR CONDITIONS

For all of the above described engine running EGR conditions, the instantaneous EGR gas temperature estimate, ext_egr, is determined as follows:

$$\text{ext\_egr} = \text{FK} \cdot \text{ext\_egr\_ss} + (1 - \text{FK}) \cdot \text{ext\_egr} \tag{12}$$

where $FK = 1/(1 + \text{tc\_tmp}/\text{bg\_tmr})$ where tc_tmp is calculated from equation (5) or (11) above, ext_egr_ss is calculated from equation (4) or (10) above, and bg_tmr is the time since last loop through this particular computer loop. Ext_egr on the right hand side of equation (12) is the value of this variable from the previous computer loop.

While the invention is described above in terms of specific embodiments, it is not intended to be limited thereto but rather only to the extent set forth in the following claims.

What is claimed is:

1. Method of estimating exhaust gas temperature at an EGR valve disposed in an EGR conduit of an EGR system of an internal combustion engine, comprising
   a) estimating exhaust gas temperature at a location of an engine exhaust manifold,
   b) estimating a drop of the exhaust gas temperature between said location and said EGR valve,
   c) determining a time constant that models exhaust gas temperature at the EGR valve as a function of EGR mass flow rate, and
   d) estimating exhaust temperature at said EGR valve by adjusting the estimated exhaust gas temperature at said location by said drop of the exhaust gas temperature and said time constant.

2. The method of claim 1 wherein said drop of the exhaust gas temperature between said location and said EGR valve is estimated when the EGR valve is closed using engine coolant temperature and air charge temperature.

3. The method of claim 1 wherein said drop of the exhaust gas temperature between the exhaust manifold and said EGR valve is estimated in step (b) by regression of the exhaust gas temperature drop in said EGR conduit per degree of potential drop of exhaust gas temperature versus EGR mass flow rate.

4. The method of claim 3 wherein the results of said regression are multiplied by a difference between a) and b) where a) is a mean temperature equal to the exhaust gas temperature at said EGR valve and the exhaust gas temperature at said location divided by 2 and b) is ambient air temperature.

5. The method of claim 1 wherein said time constant is determined by a second order regression of the time constant of EGR exhaust gas temperature as a function of EGR mass flow rate.

6. EGR system for an internal combustion engine, comprising:
   an EGR valve disposed in an exhaust gas recirculation conduit communicating an exhaust manifold and an intake manifold when said valve is opened and an electronic controller programmed to estimate exhaust gas temperature at a location of the exhaust manifold, to estimate a drop of exhaust gas temperature between the exhaust manifold and said EGR valve, to determine an EGR mass flow rate, to determine a time constant that models the exhaust gas temperature at the EGR valve versus the EGR mass flow rate, and to estimate exhaust qas temperature at said EGR valve by adjusting said estimated exhaust gas temperature at said exhaust manifold by said drop of the exhaust gas temperature and said time constant.

7. The system of claim 6 wherein said controller is programmed to estimate said drop of the exhaust gas temperature between said location and said EGR valve when the EGR valve is closed using engine coolant temperature and air charge temperature.

8. The system of claim 6 wherein said controller is programmed to estimate the drop of the exhaust gas temperature between the exhaust manifold and said EGR valve using a second order regression of the exhaust gas temperature drop in an EGR conduit per degree of potential drop of exhaust gas temperature versus the EGR mass flow rate.

9. The system of claim 8 wherein said controller is programmed to multiply the results of the second order regression by a difference between a) and b) where a) is a mean temperature equal to the exhaust gas temperature at said EGR valve and the exhaust gas temperature at said exhaust manifold divided by 2 and b) is ambient air temperature.

10. The system of claim 6 wherein said controller is programmed to determine said time constant by second order regression of the time constant of EGR exhaust gas temperature versus the EGR mass flow rate.

* * * * *

UNITED STATES PATENT AND TRADEMARK OFFICE
CERTIFICATE OF CORRECTION

PATENT NO : 6 116 083

DATED : September 12, 2000

INVENTOR(S) : Michael John CULLEN, et al.

It is certified that error appears in the above-identified patent and that said Letters Patent is hereby corrected as shown below:

Column 6, line 24; replace "qas" with ---gas---.

Signed and Sealed this

First Day of May, 2001

Attest:

NICHOLAS P. GODICI

Attesting Officer     Acting Director of the United States Patent and Trademark Office